United States Patent
Perichon

(10) Patent No.: US 6,778,369 B2
(45) Date of Patent: Aug. 17, 2004

(54) ELECTRIC DISTRIBUTION DEVICE, INSTALLATION COMPRISING SUCH A DEVICE, AND ELECTRICAL PROTECTION PROCESS

(75) Inventor: Pierre Perichon, Voiron (FR)

(73) Assignee: Schneider Electric Industries S.A. (FR)

(*) Notice: Subject to any disclaimer, the term of this patent is extended or adjusted under 35 U.S.C. 154(b) by 236 days.

(21) Appl. No.: 10/045,153

(22) Filed: Jan. 15, 2002

(65) Prior Publication Data

US 2002/0097542 A1 Jul. 25, 2002

(30) Foreign Application Priority Data

Jan. 22, 2001 (FR) .......................................... 01 00807

(51) Int. Cl.[7] .............................. H02H 3/08; H02H 9/02
(52) U.S. Cl. ........................................ 361/64; 361/93.2
(58) Field of Search ....................... 361/64, 93.1, 93.2, 361/67, 68, 72

(56) References Cited

U.S. PATENT DOCUMENTS

| | | | | | |
|---|---|---|---|---|---|
| 3,673,425 A | * | 6/1972 | Plichta | ..................... | 307/127 |
| 3,970,898 A | * | 7/1976 | Baumann et al. | ............. | 317/25 |
| 4,297,740 A | * | 10/1981 | Hagberg | ..................... | 361/67 |
| 4,996,646 A | * | 2/1991 | Farrington | .................. | 364/483 |
| 5,053,583 A | * | 10/1991 | Miller et al. | ................... | 174/36 |
| 5,303,112 A | * | 4/1994 | Zulaski et al. | ................ | 361/67 |
| 5,341,268 A | * | 8/1994 | Ishiguro et al. | ............... | 361/62 |
| 5,550,751 A | * | 8/1996 | Russell | ....................... | 364/492 |
| 5,973,899 A | * | 10/1999 | Williams et al. | .............. | 361/72 |
| 6,577,963 B1 | * | 6/2003 | Cordray et al. | ............... | 702/65 |

FOREIGN PATENT DOCUMENTS

| | | |
|---|---|---|
| DE | 31 11 255 A1 | 9/1982 |
| EP | 0 096 601 | 12/1983 |
| EP | 0 834 975 A1 | 4/1998 |
| FR | 2 688 951 | 9/1993 |

* cited by examiner

Primary Examiner—Brian Sircus
Assistant Examiner—Zeev Kitov
(74) Attorney, Agent, or Firm—Parkhurst & Wendel, L.L.P.

(57) ABSTRACT

An electrical distribution device having a main part including a main breaking device, at least one secondary part having at least one secondary breaking device, and an electrical power distribution line connected between the main and secondary parts. The secondary breaking device includes secondary control circuit for enabling opening of at least one secondary breaking device if a current flowing in said breaking device is lower than a preset opening current threshold. A distributed electrical installation includes at least one such device. An electrical protection process for an electrical distribution device includes an opening step of the secondary breaking devices when a current flowing in these devices is lower than a preset opening current threshold following detection of a fault.

22 Claims, 7 Drawing Sheets

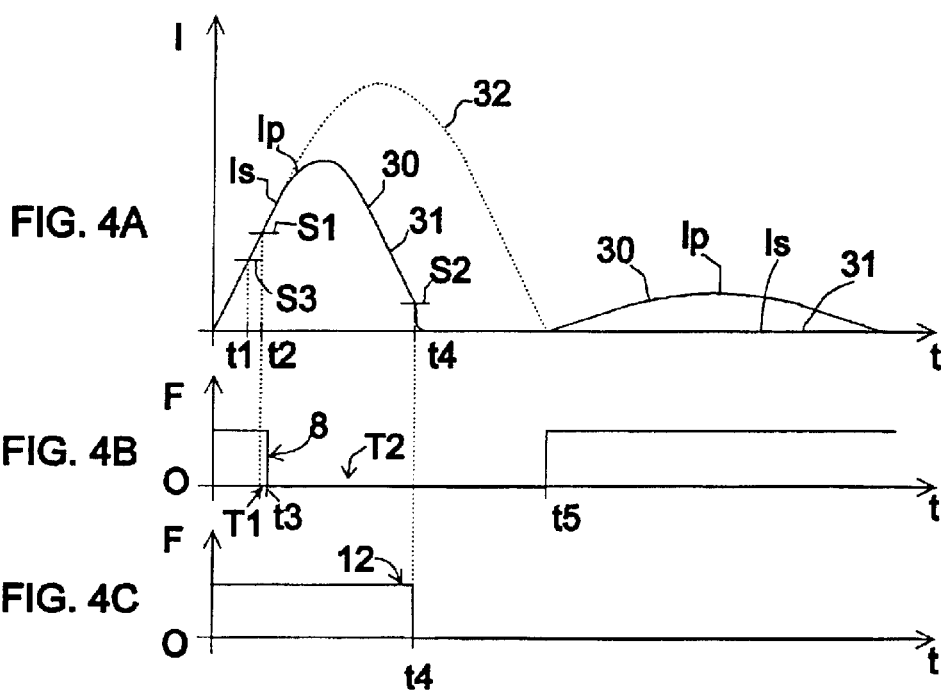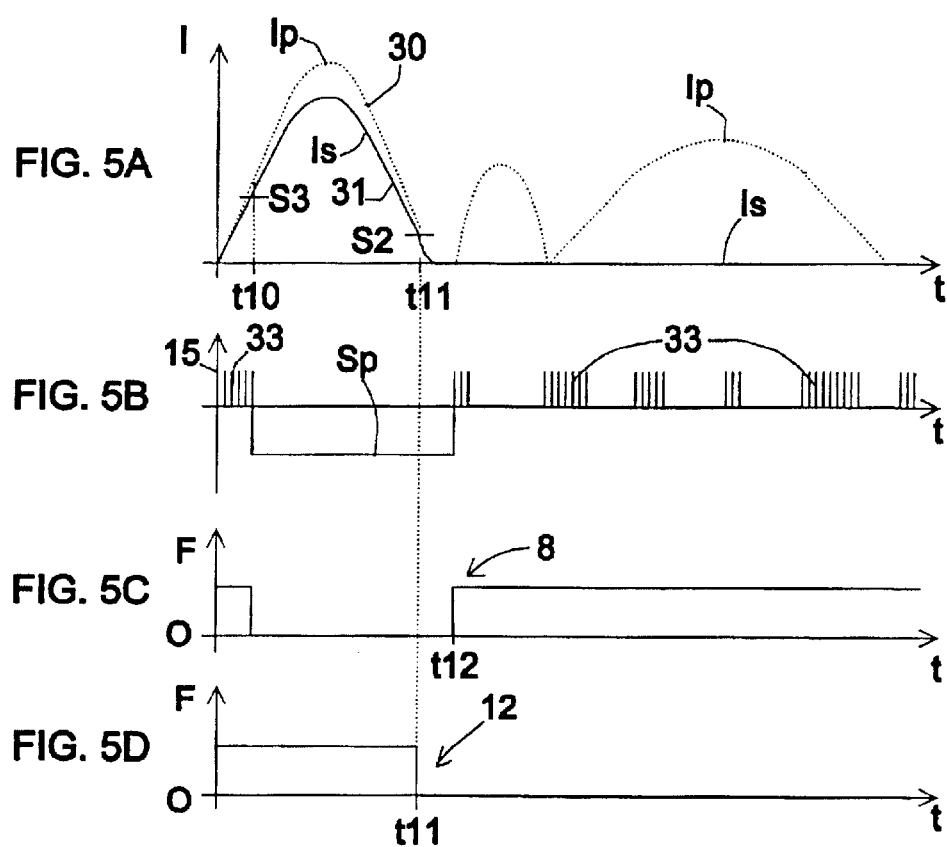

ELECTRIC DISTRIBUTION DEVICE, INSTALLATION COMPRISING SUCH A DEVICE, AND ELECTRICAL PROTECTION PROCESS

BACKGROUND OF THE INVENTION

The invention relates to an electrical distribution device comprising an input for connection of an incoming electrical line, electrical protection means connected to the input and comprising electrical distribution feeders designed to supply electrical loads, said protection means comprising:

- a main part comprising main breaking means connected to the input for connecting the incoming electrical line, and main control means for controlling opening and closing of the main breaking means, and
- an electrical power distribution line connected to the main breaking means of the main part.

The invention also relates to an installation comprising an incoming electrical line, an electrical distribution device connected to the incoming electrical line, and distribution lines connected between the electrical distribution device and electrical apparatuses or loads. The invention also relates to an electrical protection process for an electrical distribution device.

Known electrical distribution devices generally comprise a switchboard comprising a main circuit breaker to which an incoming line is connected up-line and divisional circuit breakers or fuses are connected down-line to protect distribution lines supplying loads or current output sockets.

The divisional circuit breakers can be replaced by circuit breakers or switches comprising a remote control relay controlled on opening or closing by a central protection unit. A device of this kind is described in the documents EP 0,096,601 and DE 3,111,255.

In the document FR 2,688,951, the main circuit breaker is a solid-state electronic switch and feeders are connected via isolating relays. The main circuit breaker can also be of the current limiting type like the one that is described in the document EP 0,834,975.

In known installations these distribution devices can be cascade connected. In this case, the circuit breaker ratings are generally decreasing to achieve selectivity between the devices. Selectivity can also be improved by connecting the distribution devices or their circuit breakers by means of zone selective interlocks.

State of the art devices do not enable easy management of electrical system installation. Moreover, in distributed installations that are difficult to access, it is advantageous to have breaking devices having very high reliability and endurance.

OBJECT OF THE INVENTION

The object of the invention is to provide an electrical distribution device having improved reliability and endurance and enabling easy management of an electrical installation, an installation comprising such a device, and an electrical protection process improving reliability and electrical protection fault management.

In a device according to the invention, said protection means comprise at least one secondary part separated from the main part and comprising at least one secondary breaking device and secondary control means to command opening and closing of at least one secondary breaking device, said at least one secondary breaking device being connected to said distribution line and to at least one electrical distribution feeder, the secondary control means allowing opening of at least one secondary breaking device if a current flowing in said breaking device is lower than a preset opening current threshold.

In a preferred embodiment, the main control means comprise first detection means for detecting a main fault current and first control means commanding opening of the main breaking means during a preset first time, said first detection means detecting a main fault when a first main fault current threshold is exceeded by a signal representative of a current flowing in the main breaking means.

Advantageously, the first control means command opening of the main breaking means after a time delay having a preset second duration and subsequent to detection of a main fault.

Preferably, the maximum value of the preset first time delay is ten milliseconds (10 ms).

Preferably, the main part comprises a tie breaker connected to the input for connecting an incoming electrical line and connected in series with the main breaking means.

Advantageously, the main breaking means are breaking means with power semi-conductors.

Advantageously, the secondary control means comprise second detection means for detecting a secondary fault current flowing in at least one secondary breaking device, and second control means commanding opening of said at least one secondary breaking device if a secondary fault has been detected and if a current flowing in said breaking device is lower than the preset opening current threshold, said second detection means detecting a secondary fault when a second secondary fault threshold is exceeded by a signal representative of a current flowing in said at least one secondary breaking device.

Preferably, the second detection means for detecting a secondary fault current flowing in at least one secondary breaking device comprise means for detecting a polar fault corresponding to at least one current flowing in at least one conductor of said at least one secondary breaking device.

Preferably, the second detection means for detecting a secondary fault current flowing in at least one secondary breaking device comprise means for detecting a ground fault current flowing in at least two conductors of said at least one secondary breaking device.

Advantageously, at least one secondary breaking device is an electromagnetic relay. A secondary breaking device can comprise a breaking device with electronic power components.

In a particular embodiment, the distribution device comprises a communication line and at least one secondary part comprises secondary control means comprising communication means connected to the communication line, said communication means being able to receive closing information to close at least one secondary breaking device.

Advantageously, the distribution device comprises a central unit connected to the communication line to receive status information and to command opening and/or closing of at least one secondary breaking device.

Advantageously, the primary control means comprise communication means connected to the communication line to receive control signals.

In a particular embodiment, secondary control means send a priority signal with different characteristics from an information communication signal on the communication line to command opening of the main breaking means when an electrical fault is detected in a feeder supplied by a secondary breaking device and to command closing of the main breaking means when opening of a secondary breaking device has been commanded following a fault, the primary control means comprising means for detecting said priority signal and for commanding opening and closing of the main breaking means according to the presence of said priority signal.

Preferably, at least one secondary part is arranged in a building electrical distribution or connection box.

Advantageously, at least one secondary part is arranged in a building automation communication module, the secondary control means of said secondary part comprising electrical protection functions and communication and automatic control functions to command secondary breaking devices.

Preferably, an electrical power distribution line comprising at least two conductors, a communication line comprising at least two conductors, and an electrical earth or ground line comprising at least one conductor are arranged in a flat cable comprising at least five conductors.

An electrical installation according to the invention comprises an incoming electrical line, an electrical distribution device connected to the incoming electrical line, and distribution lines connected between the electrical distribution device and electrical apparatuses or loads, the distribution device being a distribution device as defined above and having a main part connected to the incoming electrical line and at least one secondary part connected to distribution lines.

An electrical protection process according to the invention comprises:
- a first step of detection of an electrical fault in main breaking means,
- a second step of detection of an electrical fault in secondary breaking means connected by a distribution line to the main breaking means,
- a time delay step,
- an opening step of the main breaking means,
- an opening step of the secondary breaking means when a current flowing in these means is lower than a preset opening current threshold value following detection of a fault at the second detection step,
- a first closing step of the main breaking means after a preset time delay.

In a preferred embodiment, the process comprises:
- a second opening step of the main breaking means commanded by transmission of a priority opening command signal on a communication line connected between secondary breaking means and the main breaking means, said priority signal being transmitted when a fault current flowing in a secondary breaking device is detected,
- a second closing step of the main breaking means after an end of transmission of said priority signal step.

In another embodiment, an electrical protection process according to the invention comprises:
- a first step of detection of an electrical fault in secondary breaking means connected by a distribution line and a communication line to main breaking means,
- a step of beginning of transmission of a priority opening command signal on said communication line to command opening of the main breaking means,
- a first opening step of the main breaking means commanded by transmission of said priority opening command signal on said communication line,
- a second opening step of the secondary breaking means when a current flowing in these means is lower than a preset opening current threshold value following detection of a fault at the first detection step,
- a step of end of transmission of the priority opening command signal,
- a closing step of the main breaking means after the end of transmission of the priority opening command signal step.

BRIEF DESCRIPTION OF THE DRAWINGS

Other advantages and features of the invention will become more clearly apparent from the following description of particular embodiments of the invention given as non-restrictive examples only and represented in the accompanying drawings in which:

FIGS. 4A, 4B and 4C represent signals in a distribution device according to a first embodiment of the invention, FIGS. 5A, 5B, 5C and 5D represent signals in a distribution device according to a second embodiment of the invention.

DESCRIPTION OF A PREFERRED EMBODIMENT

Figure 1:
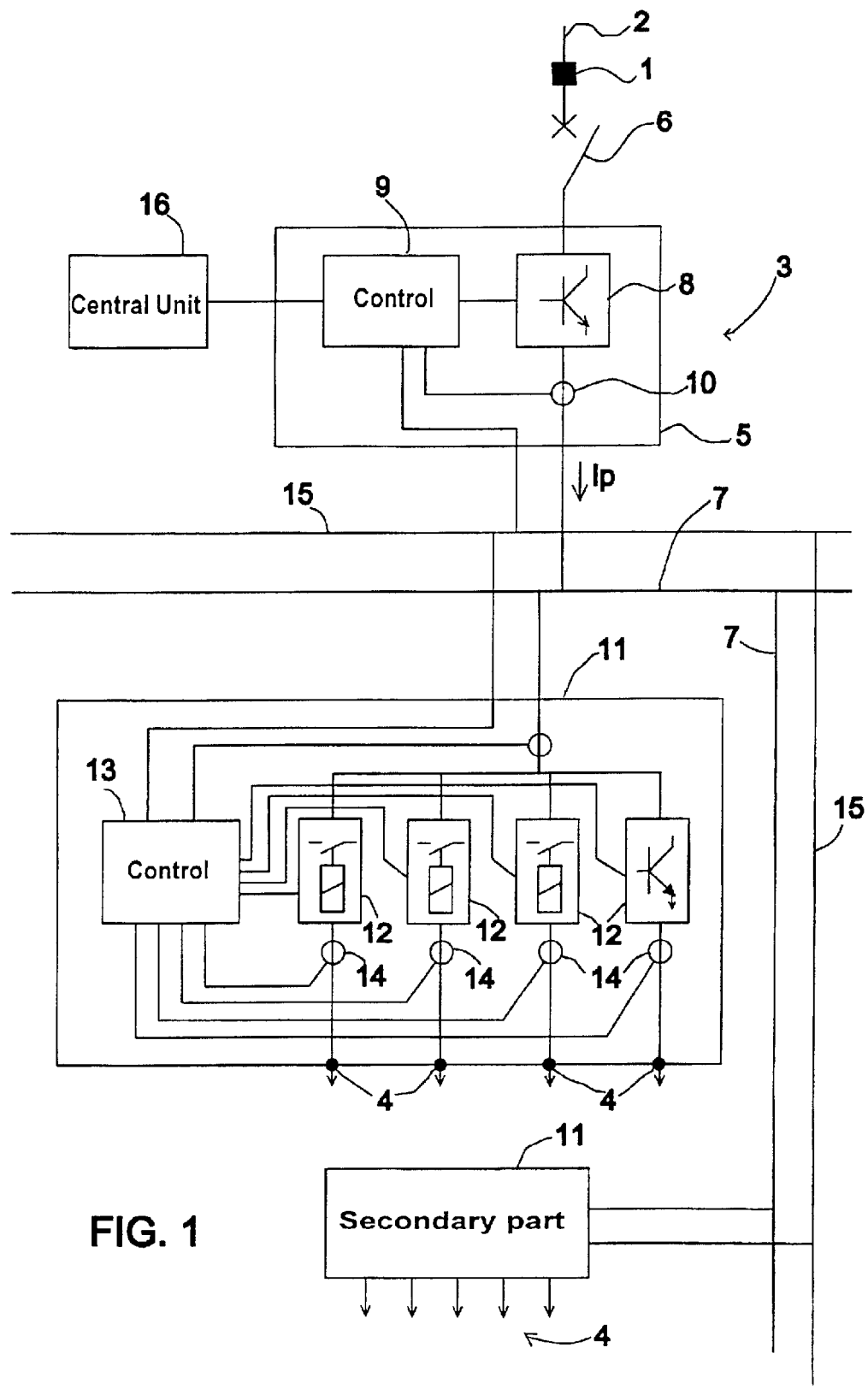
FIG. 1 represents the diagram of a distribution device comprising features of the invention.

An electrical distribution device represented in FIG. 1 comprises an electrical connection input 1 to connect an incoming line 2 to electrical protection means 3 comprising feeders 4 for supply of electrical loads. These electrical protection means comprise a main part 5 connected to the input 1 via a main circuit breaker 6 and an electrical power distribution line 7. The main part 5 comprises a main breaking device 8 connected in series between the input 1 and the distribution line 7 to make or break an electrical current in the line 7, and a main control circuit 9 connected to said main breaking device 8 to command opening and closing of said device 8. At least one current sensor 10 arranged on at least one conductor connected to the main breaking device 8 supplies a signal representative of a current Ip flowing in the device 8.

The distribution line 7 supplies at least one secondary part 11 separated from the main part and comprising at least one secondary breaking device 12 and at least one secondary control circuit 13 to command opening and closing of at least one secondary breaking device 12. Said at least one secondary breaking device 12 is connected to the distribution line 7 and to at least one electrical distribution feeder 4. At least one current sensor 14 is arranged on at least one conductor connected to a secondary breaking device to supply a signal representative of a current flowing in said secondary breaking device 12.

When the secondary breaking devices are devices with electrical contacts, for example electromagnetic relays, it is preferable to increase the reliability and lifetime by preventing wear of the contacts. This advantage is particularly important when the secondary parts are distributed at several locations of an installation and are difficult to access.

The secondary control circuit 13 commands or authorizes opening of a secondary breaking device when a current flowing in this device is lower than a preset opening current threshold. Thus, when an electrical fault occurs, the control circuit 13 detects the secondary breaking device that has to be broken, by means of a current sensor 14, and than waits for the main breaking device to open to limit the current flowing in said secondary device. Then, when the current drops below the preset opening current threshold, the control circuit gives an opening order to the secondary breaking device concerned by the fault. By acting in this way, the secondary circuit contacts are preserved and the reliability and lifetime are increased.

The main control circuit 9 comprises means for determining a main fault current and commands opening of the main breaking device during a preset first time sufficient to leave the secondary breaking device the time to open after the fault current flowing though this secondary breaking device has decreased. This time is also sufficiently short not to disturb the operation of electrical circuits because of a current interruption. For example, a value of the first time duration can be 10 milliseconds (ms). Advantageously, opening of the main breaking circuit is commanded after a time delay having a preset second duration to enable a secondary control circuit to detect the presence of a fault in order to subsequently command opening of a secondary breaking device.

In another embodiment the electrical distribution device comprises a communication line 15 connecting communication circuits arranged in at least one secondary part, and in particular in a central communication unit 16 and in the main part. In the secondary part, a communication circuit can receive closing information from at least one secondary breaking apparatus after an electrical fault has been cleared in particular. The central unit can receive status information and command closing and/or opening of at least one secondary breaking device.

The control circuit 9 of the main part 5 comprises a communication circuit connected to the communication line 15 to receive a control signal. Advantageously, a secondary control circuit 13 sends a particular priority signal Sp with different characteristics from a conventional communication signal on the communication line to command opening of the main breaking device 8 when a fault is detected in a feeder supplied by a secondary breaking device. The particular priority signal Sp also commands closing of the main closing device when opening of a secondary breaking device has been commanded following a fault. Thus, the primary control circuit 9 comprises means for detecting a said particular priority signal and for commanding opening and closing of the main breaking means according to the presence of said particular priority signal.

Figure 2:
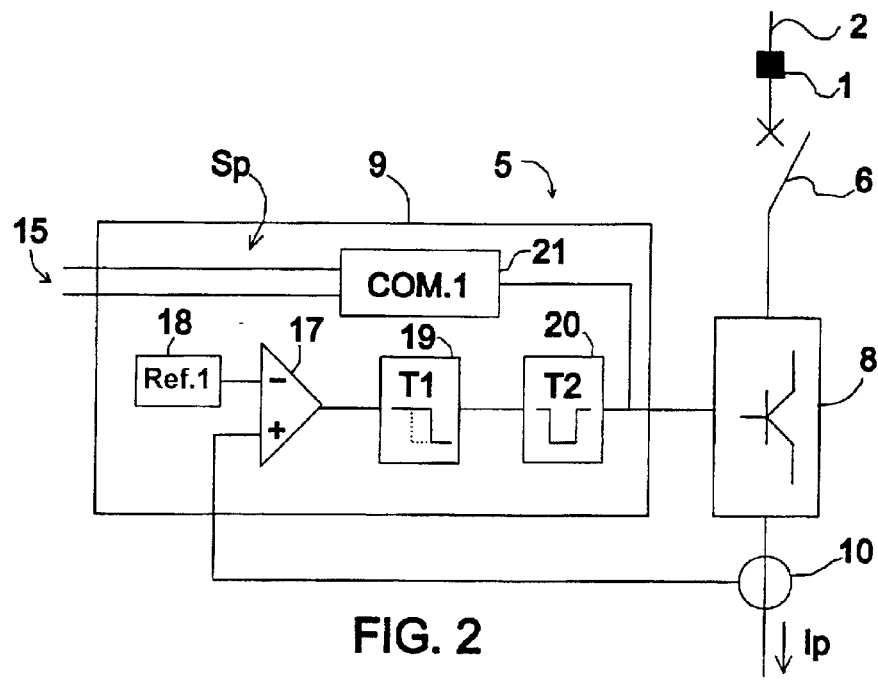
FIG. 2 represents a diagram of a main part of a distribution device according to an embodiment of the invention.

FIG. 2 shows a simplified block diagram of a main part 5 comprising a main control circuit 9. The current sensor 10 supplies a signal representative of a current Ip flowing in at least one conductor of the main breaking device 8 to a comparator 17. This signal is compared with a reference threshold 18. If an electrical fault occurs, the threshold is exceeded and the comparator commands an opening delay device 19 of time delay T1 to enable a secondary control circuit to detect the fault. Then a delayed action circuit 20 commands opening of the main breaking device during a time T2 to enable opening of a secondary breaking device. The time T1 is preferably less than one millisecond and the time T2 is preferably less than 10 milliseconds. The circuits 18 and 19 can be arranged in reverse order, the effects on control of the device 8 being the same.

The circuit 9 of FIG. 2 comprises a communication circuit 21 enabling the main breaking device to be commanded according to control information sent on the communication line or according to the presence on the line of a particular priority signal Sp. Thus, when a signal Sp sent by a secondary control circuit is present on the line, the device 8 is open throughout the duration of said signal Sp.

Figure 3:
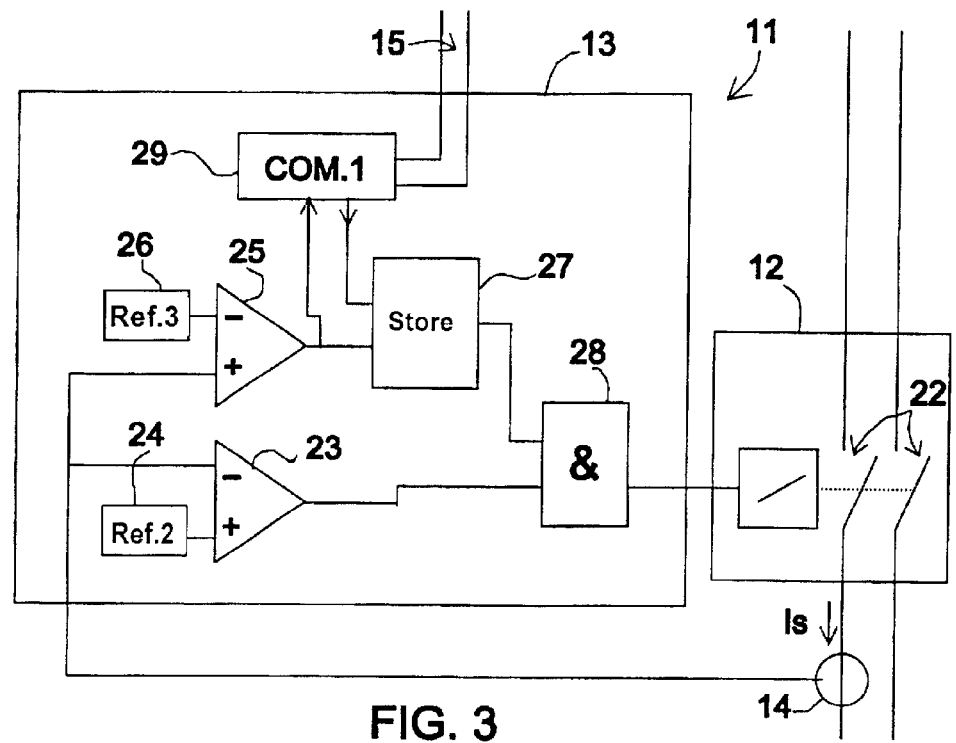
FIG. 3 represents a diagram of a secondary part of a distribution device according to an embodiment of the invention.

FIG. 3 shows a simplified block diagram of a secondary part 11 comprising a secondary control circuit 13 and a secondary breaking device 12. The device 12 is an electromagnetic relay comprising electrical contacts 22. A current sensor 14 supplies a signal representative of a secondary current Is to a comparator 23 that enables opening of the relay 12 to be authorized if the current Is is lower than a preset opening threshold. This threshold is supplied to the comparator 23 by a reference 24. To detect the presence of a fault, a second comparator 25 receives the signal representative of the current Is and compares this signal with a fault threshold represented by a reference 26. When a fault threshold is exceeded, the comparator 25 commands an opening command storage circuit 27. Then a command circuit 28 connected to the comparator 23 and to the storage circuit 27 commands opening of the relay if an opening command is stored and if the current drops below the opening threshold. In certain cases the secondary breaking device 12 can also comprise a device with electronic power components in particular for current or voltage regulation or for lighting modulation or speed variation.

In the embodiment of FIG. 3, the secondary control circuit comprises a communication circuit 29 connected to the communication line 15 and to means for detecting electrical faults such as the comparator 25. When a fault is detected, it sends a particular priority signal Sp on the communication line 15 to command opening of the main breaking device 8. During transmission of the signal Sp the current decreases or is interrupted and opening of the secondary breaking device 12 can be commanded as soon as the current detected by the sensor 14 drops below the opening threshold.

The communication circuit 29 can also serve the purpose of communicating with other communication devices arranged in particular in a central communication unit 16 or a main part 3. In this case, the circuit 29 can send status information from the different secondary breaking devices and/or information on the values of the currents flowing in feeders. The circuit 29 can also receive closing or opening commands of secondary breaking devices sent in particular by a central communication unit or a main part.

The diagrams of FIGS. 2 and 3 are symbolic embodiments showing functions performed by control circuits. These circuits can be achieved in other forms. They can in particular be integrated in microprocessors, in microcontrollers, in devices comprising analog circuits, digital circuits and/or analog-to-digital converters. The control circuits 9 and 13 can have signal processing functions and electrical protection and tripping functions. For example, rms or peak current processing functions and long delay, short delay, instantaneous, and/or earth protection tripping functions.

FIGS. 4A, 4B and 4C illustrate operating curves of a device according to a first embodiment. In FIG. 4A, two curves 30 and 31 represent a short-circuit current detected by a current sensor 10 detecting the main current Ip and a current sensor 14 detecting a secondary current Is, and a curve 32 represents an unbroken prospective short-circuit current. FIG. 4B represents control of a main breaking device 8 and FIG. 4C represents control of a secondary breaking device 12.

At a time t1, the current Is in a secondary breaking device exceeds a detection threshold S3 of an electrical fault in a secondary control circuit 13. Then at a time t2, the current Ip exceeds a current detection threshold S1 of an electrical fault in a main control circuit 9. After a time delay T1 of short duration, at a time t3, opening of the main breaking device is commanded and the secondary breaking device remains closed. Then at a time t4, the secondary current Is drops below an opening threshold S2 and opening of the secondary breaking device is commanded. When the secondary breaking device has opened, at a time t5, closing of the main breaking device is commanded. The power supply to the faulty feeder is thus interrupted without any wear of the contacts of the secondary breaking device. The time T2 during which the power supply to the main breaking device is interrupted, between the times t3 and t5, is short and does not disturb operation of the electrical installation. The power supply interruption time is less than one full-wave of an AC mains power system. The power supply interruption time is advantageously about one half-wave i.e. from about 8 to 10 milliseconds.

FIGS. 5A, 5B, 5C and 5D illustrate operating curves of a device according to a second embodiment. In FIG. 5A, two curves 30 and 31 represent a short-circuit current detected by a current sensor 10 detecting the main current Ip and a current sensor 14 detecting the secondary current Is. FIG. 5B represents signals on a communication line 15 on which communication signals 33 and a particular priority signal Sp can be transmitted. FIG. 5C represents command of a main breaking device 8 and FIG. 5D represents command of a secondary breaking device 12.

At a time t10, a secondary current Is exceeds a detection threshold S3 of an electrical fault in a secondary control circuit 13. The circuit 13 then forces a signal Sp on the communication line 15 and the communication signal frames 33 are interrupted. A main control circuit 5 detects the particular priority signal Sp and commands opening of the main breaking device 8. The currents Ip and Is decrease, then at the time t11 the control circuit 13 detects Is dropping below the opening threshold S2. Opening of the secondary breaking device 12, on which a fault occurred, is then commanded. Then at the time t12, when the device 12 has opened, the signal Sp is interrupted and the main control circuit commands closing of the main breaking device. The communication signal frames 33 can then be transmitted again.

The particular priority signal Sp is of a different nature from the communication signal frames 33. It can be a DC voltage for example of different amplitude from the frame signals. Advantageously, the signal Sp can be of reverse polarity to the communication signal pulses as represented in FIG. 5B.

In the second embodiment, the distribution device can also be made to operate with the operating mode described in the first embodiment. The fault currents detected can be short-circuit, overload and/or ground fault currents.

Figure 6:
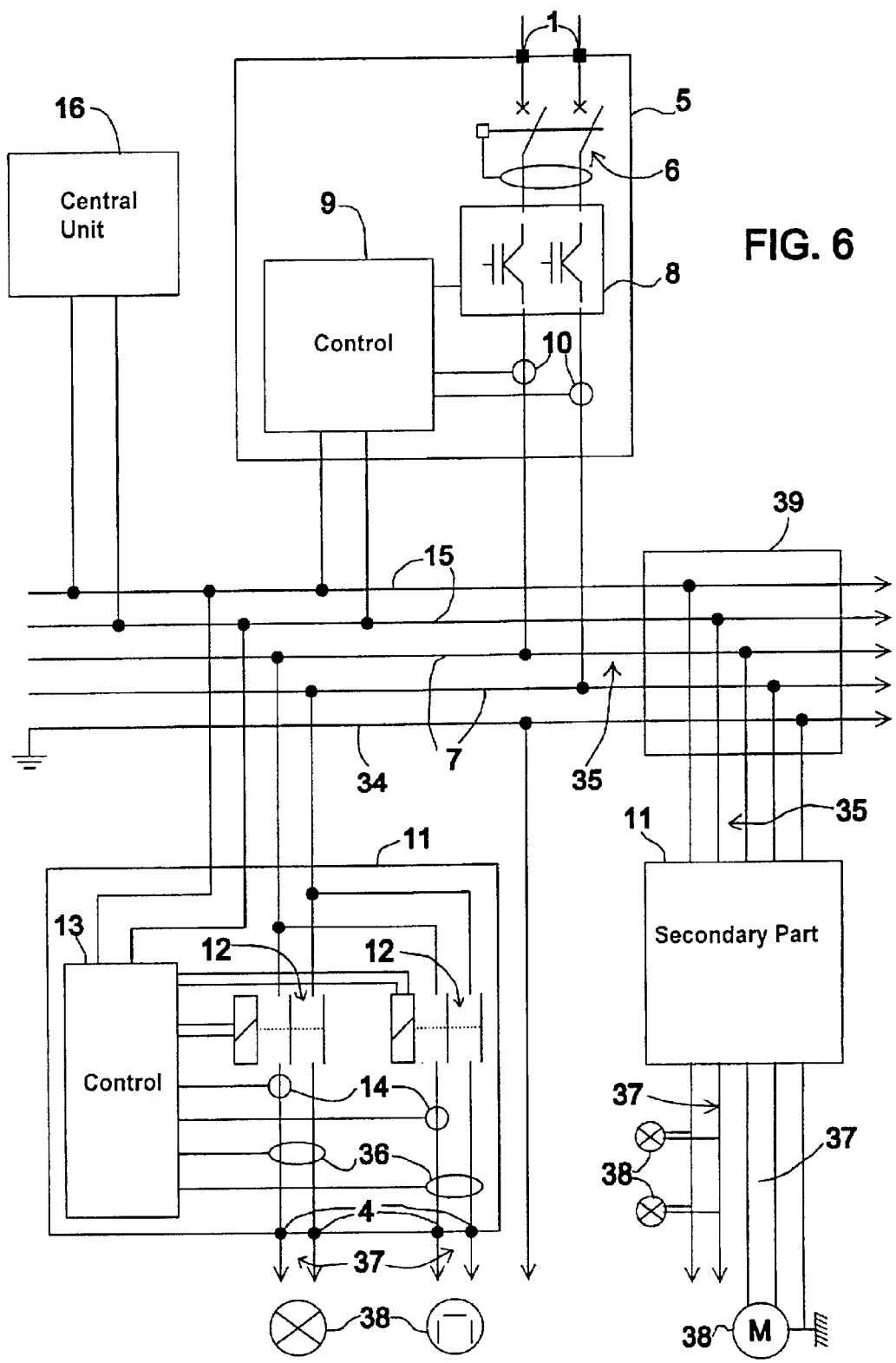
FIG. 6 represents a diagram of a device and of an installation according to an embodiment of the invention.

In the diagram of FIG. 6, the main part 5 comprises a tie breaker 6 connected between the input 1 and the main breaking device 8. The main breaking device 8 is a power semi-conductor device. In this embodiment, the distribution line circuit 7 comprises two conductors, the communication line 15 comprises two conductors, and an electrical earth or ground line 34 comprises one conductor. Preferably, the distribution line conductors, communication line conductors and earth line conductor are arranged in a flat cable 35 comprising at least five conductors. Flat cables 35 can be connected via suitable connection or junction boxes 39.

Secondary parts 11 can form parts of building automation system communication modules. In this case, control circuits 13 can comprise electrical protection functions, and communication and automatic control functions to command secondary breaking devices. The secondary parts 11 can be arranged in electrical distribution or connection boxes.

Figure 7:
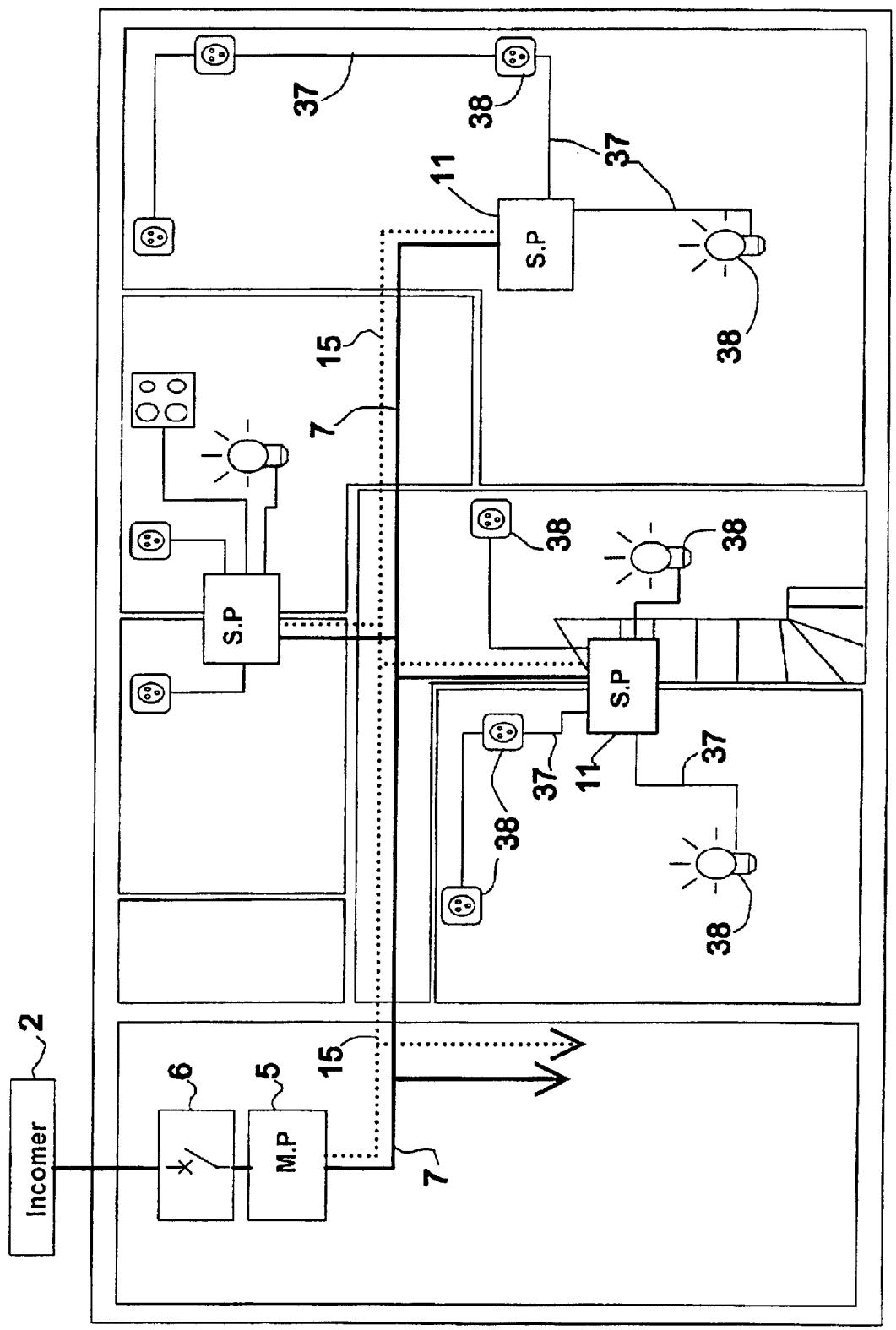
FIG. 7 represents a layout of an electrical installation according to an embodiment of the invention.

A secondary part 11 of FIG. 7 comprises polar current sensors 14 and differential or earth fault protection current sensors 36. The feeders 4 supply electrical loads 38 such as lights, current sockets, heating appliances, or motors via electrical distribution lines 37.

The secondary breaking devices 12 are preferably electromagnetic relays comprising electrical contacts. These relays can be of bistable type with one stable closed position and one stable open position.

FIG. 7 represents the layout of an electrical installation able to comprise the features according to an embodiment of the invention. Secondary parts 11 can be located in places to which access is difficult, such as ceilings for example.

Figure 8:
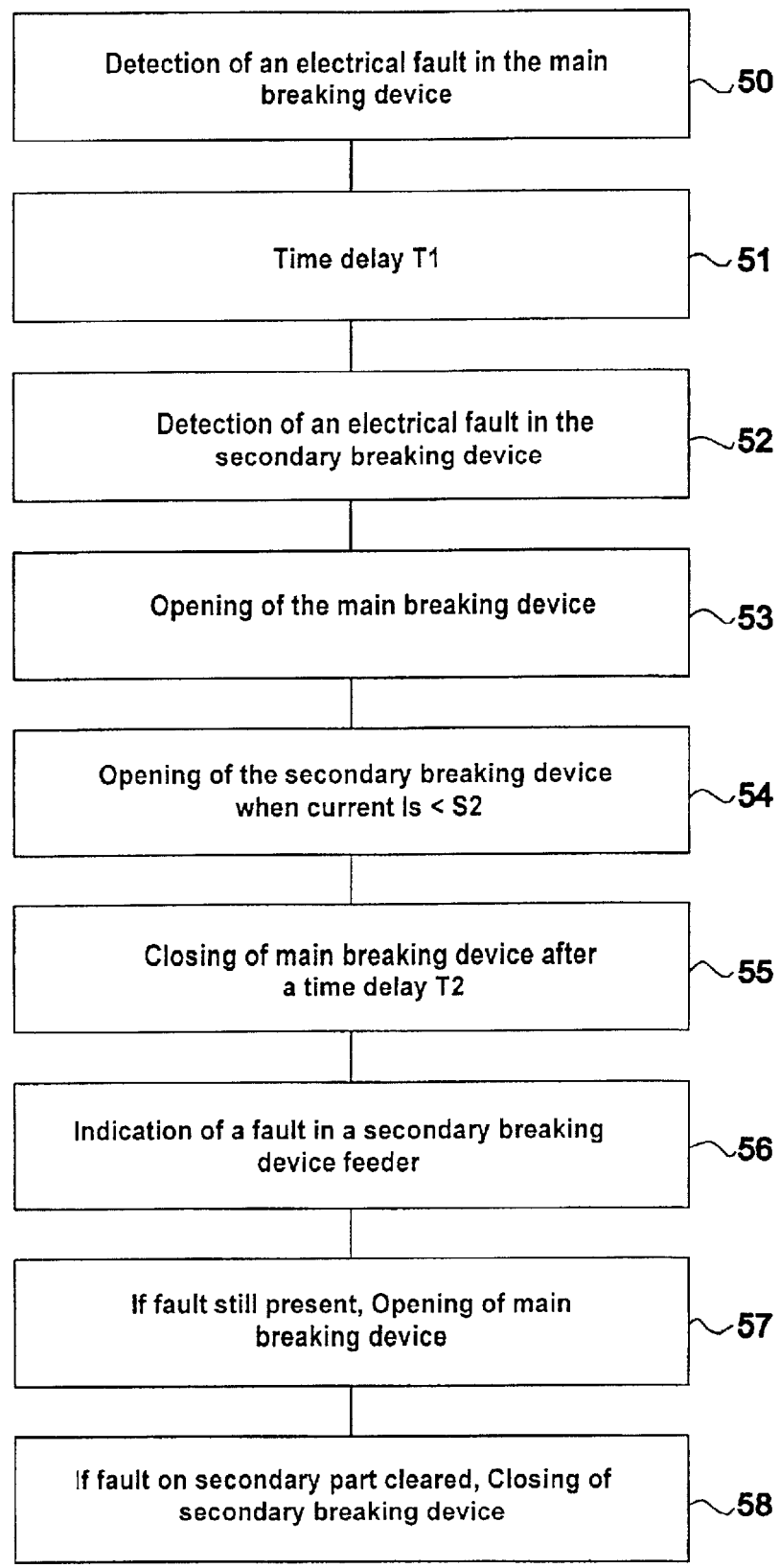
FIG. 8 represents a first electrical protection process according to an embodiment of the invention.

The flowchart of FIG. 8 represents a first electrical protection process for a distribution device or an electrical installation comprising a main part with a main breaking device, at least one secondary part comprising a secondary breaking device, and a distribution line between the main and secondary parts.

In this process, an electrical fault in a current flowing in a main breaking device can be detected by a main control circuit in a first step 50. In a step 51, a time delay T1 of short duration enables a fault to be taken into account by a secondary part. An electrical fault can be detected by a secondary control circuit of a fault current in a secondary breaking device in a step 52. In a step 53, the main breaking device is open to limit or momentarily interrupt the current in the secondary breaking device. Then, in a step 54, opening of the faulty secondary breaking device is commanded when the current flowing in this device is lower than an opening current threshold S2. In a step 55, closing of the secondary breaking device is commanded after a time delay T2. This time delay may depend for example on the opening time of the secondary breaking device.

A fault in a secondary breaking device feeder can be indicated in a step 56. Such an indication can be recorded in the main part or be transmitted on a communication line from a secondary part or a main part to a central communication unit. If the fault is still present after the secondary breaking device has opened or if a secondary breaking device does not have a fault current, opening of the main breaking is commanded in a step 57. If a fault on a feeder of a secondary part is cleared, closing of a secondary breaking device can be commanded to re-establish the current. The command can advantageously be transmitted via a communication line from a central communication unit or a main part.

Figure 9:
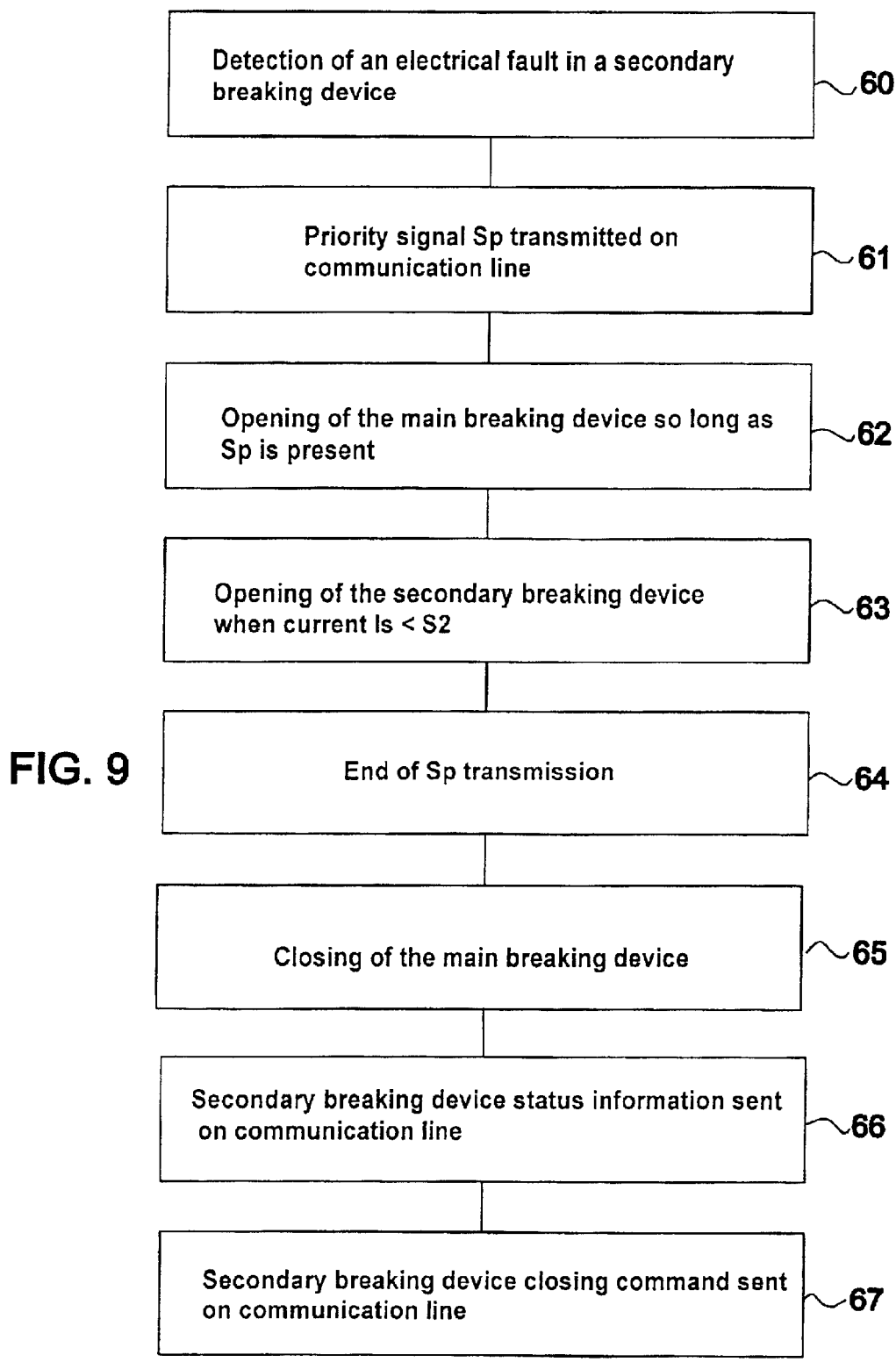
FIG. 9 represents a second electrical protection process according to an embodiment of the invention.

The flowchart of FIG. 9 represents a second electrical distribution process for a distribution device or an electrical installation comprising a main part with a main breaking device and at least one secondary part comprising a secondary breaking device, a distribution line and a communication line between the main and secondary parts.

In this process, an electrical fault in a current flowing in a secondary breaking device can be detected by a secondary control circuit in a first step 60. When a fault is detected, in a step 61, a particular priority signal Sp is sent on the communication line to command opening of a main breaking device. So long as the signal Sp is present, in a step 62, the breaking device remains open. Then, in a step 63, when the current Is in the secondary breaking device is lower than an opening threshold S2, opening of the breaking device is commanded. Then, when the breaking device has opened, a step 64 marks the end of transmission of the priority signal Sp. In a step 65, the main breaking device is then reclosed and the power supply is re-established.

Information representative of the status of the secondary breaking devices, in particular the status of the device that is in the open position following opening on an electrical fault, can be sent on the communication line in a step 66. In this information, the causes of tripping or opening can also be identified, in particular short-circuits, overloads, earth leakage currents or emergency stop commands. A secondary breaking device closing command can be sent on the communication line in a step 67. This command concerns in particular closing of secondary breaking devices after an electrical fault has been cleared.

The processes of FIGS. 8 and 9 can operate independently or be associated in a single process. An electrical distribution device and an installation can have parts operating according to the first process, parts operating according to the second process and/or parts operating according to a combination of the two processes.

What is claimed is:

1. An electrical distribution device comprising an input for connection to an incoming electrical line, electrical protection means connected to the input and electrical distribution feeders for supplying electrical loads, said protection means comprising:
   a main part comprising main breaking means connected to the input, and main control means for controlling opening and closing of the main breaking means, and
   at least one secondary part separated from the main part and comprising at least one secondary breaking device and secondary control means for commanding opening and closing of at least one secondary breaking device, said at least one secondary breaking device for connection to an electrical power distribution line and to at least one electrical distribution feeder, the secondary control means for enabling opening of at least one secondary breaking device if a current flowing in said breaking device is lower than a preset opening current threshold.

2. The distribution device according to claim 1, wherein the main control means comprise first detection means for detecting a main fault current and first control means for commanding opening of the main breaking means during a preset first time, said first detection means for detecting a main fault indicated by a signal representative of a first main fault current threshold being exceeded by a current value of a current flowing in the main breaking means.

3. The distribution device according to claim 2, wherein the first control means is for commanding opening the main breaking means after a time delay having a preset second duration and subsequent to detection of a main fault.

4. The distribution device according to claim 2, wherein the maximum value of the preset first time delay is ten milliseconds.

5. The distribution device according to claim 1, wherein the main part comprises a head breaker connected to the input for connecting an incoming electrical line and connected in series with the main breaking means.

6. The distribution device according to claim 1, wherein the main breaking means are breaking means comprising power semi-conductors.

7. The distribution device according to claim 1, wherein the secondary control means comprise second detection means for detecting a secondary fault current flowing in at least one secondary breaking device, and second control means for commanding opening of said at least one secondary breaking device if a secondary fault has been detected and if a current flowing in said breaking device is lower than the preset opening current threshold, said second detection means for detecting a secondary fault indicated by a signal representation of a second secondary fault threshold being exceeded by a current flowing in said at least one secondary breaking device.

8. The distribution device according to claim 7, wherein the second detection means for detecting a secondary fault current flowing in at least one secondary breaking device comprise means for detecting a fault corresponding to at least one current flowing in at least one conductor of said at least one secondary breaking device.

9. The distribution device according to claim 7, wherein the second detection means for detecting a secondary fault current flowing in at least one secondary breaking device comprise means for detecting a ground fault current flowing in at least two conductors of said at least one secondary breaking device.

10. The distribution device according to claim 1, wherein at least one secondary breaking device comprises an electromagnetic relay.

11. The distribution device according to claim 1, wherein at least one secondary breaking device comprises a breaking device with electronic power components.

12. The distribution device according to claim 1, wherein at least one secondary part comprises secondary control means comprising communication means for connection to a communication line, said communication means for receiving closing information to close at least one secondary breaking device.

13. The distribution device according to claim 12, comprising a central unit for connection to a communication line to receive status information and to command opening and/or closing of at least one secondary breaking device.

14. The distribution device according to claim 12, wherein the primary control means comprise communication means connected to a communication line to receive control signals.

15. The distribution device according to claim 14, wherein secondary control means is for sending a priority signal with second characteristics different from first characteristics of an information communication signal on a communication line to command opening of the main breaking means when an electrical fault is detected in a feeder supplied by a secondary breaking device and to command closing of the main breaking means when opening of a secondary breaking device has been commanded following a fault, the primary control means comprising means for detecting said priority signal and for commanding opening and closing of the main breaking means according to the presence of said priority signal.

16. The distribution device according to claim 1, wherein at least one secondary part is located in a building electrical distribution or connection box.

17. The distribution device according to claim 1, wherein at least one secondary part is located in a building automation communication module, the secondary control means of said secondary part comprising electrical protection functions and communication and automatic control functions for commanding secondary breaking devices.

18. The distribution device according to claim 12, further comprising a flat cable connected to the electrical distribution device, the flat cable comprising at least five conductors comprising an electrical ground line comprising at least one conductor, an electrical power distribution line comprising at least two conductors, a communication line comprising at least two conductors, and an electrical ground line comprising at least one conductor.

19. An electrical installation comprising the electrical distribution device according to claim 1, an incoming electrical line, connected to the electrical distribution device, and a plurality of distribution lines connected between the electrical distribution device and electrical apparatuses or loads, wherein said main part is connected to the incoming electrical line and said at least one secondary part is connected to said plurality of distribution lines.

20. An electrical protection process for an electrical distribution device, comprising:

first detecting an electrical fault in main breaking means, second detecting an electrical fault in secondary breaking means connected by a distribution line to the main breaking means, delaying said protection process, opening the main breaking means, opening the secondary breaking means when a current flowing in said secondary breaking means is lower than a preset opening current threshold value following detection of a fault at said second detecting, and first closing the main breaking means after a preset time delay.

21. The electrical protection process according to claim 20, comprising:

second opening the main breaking means commanded by transmission of a priority opening command signal on a communication line connected between the secondary breaking means and the main breaking means, said priority signal being transmitted when a fault current flowing in a secondary breaking device is detected, and second closing the main breaking means after an end of transmission of said priority signal step.

22. An electrical protection process for an electrical distribution device comprising:

first detecting an electrical fault in secondary breaking means connected by a distribution line and a communication line to main breaking means, beginning transmitting a priority opening command signal on said communication line to command opening of the main breaking means, first opening the main breaking means commanded by transmission of said priority opening command signal on said communication line, second opening the secondary breaking means when a current flowing in secondary breaking means is lower than a preset opening current threshold value following detection of a fault at said first detecting, ending transmitting the priority opening command signal, and closing the main breaking means after said ending transmitting the priority opening command signal.

* * * * *